(12) United States Patent
Belov et al.

(10) Patent No.: US 9,589,303 B2
(45) Date of Patent: Mar. 7, 2017

(54) SELECTIVE PRESENTATION OF CONTENT TYPES AND SOURCES IN SEARCH

(71) Applicant: Google Inc., Mountain View, CA (US)

(72) Inventors: Daniel Belov, San Francisco, CA (US); Matthew E. Kulick, San Francisco, CA (US); Adam D. Bursey, San Jose, CA (US); David Yen, Plano, TX (US); Maureen Heymans, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/737,245

(22) Filed: Jan. 9, 2013

(65) Prior Publication Data
US 2016/0154884 A1    Jun. 2, 2016

Related U.S. Application Data

(60) Provisional application No. 61/584,602, filed on Jan. 9, 2012.

(51) Int. Cl.
*G06F 17/30* (2006.01)
*G06Q 50/00* (2012.01)

(52) U.S. Cl.
CPC ....... *G06Q 50/01* (2013.01); *G06F 17/30864* (2013.01); *G06F 17/30867* (2013.01)

(58) Field of Classification Search
CPC .................................................. G06F 17/30864

USPC .......................................................... 707/748
See application file for complete search history.

(56) References Cited

U.S. PATENT DOCUMENTS

| | | | |
|---|---|---|---|
| 2007/0061297 A1* | 3/2007 | Bihun et al. | 707/3 |
| 2009/0292814 A1* | 11/2009 | Ting et al. | 709/229 |
| 2011/0145219 A1* | 6/2011 | Cierniak | G06F 17/30867 707/709 |
| 2011/0320437 A1* | 12/2011 | Kim et al. | 707/722 |
| 2012/0131683 A1* | 5/2012 | Nassar et al. | 726/28 |
| 2012/0323908 A1* | 12/2012 | Herbert et al. | 707/728 |

* cited by examiner

*Primary Examiner* — Grace Park
(74) *Attorney, Agent, or Firm* — Fish & Richardson P.C.

(57) ABSTRACT

Implementations of the present disclosure include actions of receiving a search query, identifying potential search results responsive to the search query, the potential search results corresponding to digital content stored in one or more computer-readable storage media, determining that the potential search results include user-generated content that is generated using one or more computer-implemented social services, receiving data associated with the user-generated content, the data including one or more scores, determining, based on the one or more scores, that the user-generated content is to be provided as a search result, generating search results, the search results including web-based search results and at least a portion of the user-generated content, and transmitting the search results to a client computing device for display to the searching user.

27 Claims, 6 Drawing Sheets

SELECTIVE PRESENTATION OF CONTENT TYPES AND SOURCES IN SEARCH

CROSS-REFERENCE TO RELATED APPLICATIONS

This application claims the benefit and priority of U.S. Provisional Application No. 61/584,602, filed Jan. 9, 2012, the disclosure of which is expressly incorporated herein by reference in the entirety.

BACKGROUND

The present disclosure relates to searching.

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

A large number of search results can be returned for a given query. Consequently, it can be difficult for a searching user to choose a result that is most relevant to the searching user or that provides advice that the searching user is comfortable relying upon. A searching user may give more weight to search results that are associated with reviews, opinions, or other content associated with the searching user's social graph (e.g., contacts of the user) and/or other users. However, these search results can be clouded by content associated with other users.

SUMMARY

This specification describes technologies relating to searching.

In general, one aspect of the subject matter described in this specification can be embodied in methods that include the actions of receiving a search query, identifying potential search results responsive to the search query, the potential search results corresponding to digital content stored in one or more computer-readable storage media, determining that the potential search results include user-generated content that is generated using one or more computer-implemented social services, receiving data associated with the user-generated content, the data including one or more scores, determining, based on the one or more scores, that the user-generated content is to be provided as a search result, generating search results, the search results including web-based search results and at least a portion of the user-generated content, and transmitting the search results to a client computing device for display to the searching user. Other embodiments of this aspect include corresponding systems, apparatus, and computer program products.

These and other embodiments can optionally include one or more of the following features: determining that a topicality score associated with the user-generated content is greater than or equal to a threshold topicality score, the topicality score being included in the one or more scores, wherein determining that the user-generated content is to be provided as a search result occurs in response to determining that the topicality score associated with the user-generated content is greater than or equal to the threshold topicality score; the topicality score indicates a degree to which the user-generated content pertains to the search query; the topicality score indicates a degree to which the user-generated content pertains to a matter of interest; actions further include determining that the user-generated content is recently generated content, wherein determining that the topicality score associated with the user-generated content is greater than or equal to the threshold topicality score occurs in response to determining that the user-generated content is recently generated content; actions further include: determining that the search query is a trending search query, and determining that the user-generated content is recently generated content, wherein determining that the topicality score associated with the user-generated content is greater than or equal to the threshold topicality score occurs in response to determining that the search query is a trending search query and determining that the user-generated content is recently generated content; actions further include determining that an overall score associated with the user-generated content is greater than or equal to a threshold overall score, the overall score being included in the data, wherein determining that the user-generated content is to be provided as a search result occurs in response to determining that the overall score associated with the user-generated content is greater than or equal to the threshold overall score; actions further include determining that the search query is not a trending search query, wherein determining that the overall score associated with the user-generated content is greater than or equal to the threshold overall score occurs in response to determining that the search query is not a trending search query; the overall score reflects a quality of the user-generated content and a relevance of the user-generated content to the searching user; actions further include: determining that the user-generated content comprises a digital image, and determining that the digital image is to be displayed within an image search results portion of the search results; actions further include determining that the user-generated content is without text associated with the digital image, wherein determining that the digital image is to be displayed within the image search results portion of the search results occurs in response to determining that the user-generated content is without text associated with the digital image; the user-generated content includes content generated by the searching user; the user-generated content includes content generated by an author user; the author user is a member of a social graph of the searching user; the user-generated content includes at least one of an electronic message, text provided in a chat session, a post to a social networking service, a digital image; and the one or more social computer-implemented services include at least one of a social networking service, an electronic messaging service, a chat service, a micro-blogging service, a blogging service and a digital content sharing service.

The details of one or more embodiments of the present disclosure are set forth in the accompanying drawings and the description below. Other features, aspects, and advantages of the present disclosure will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
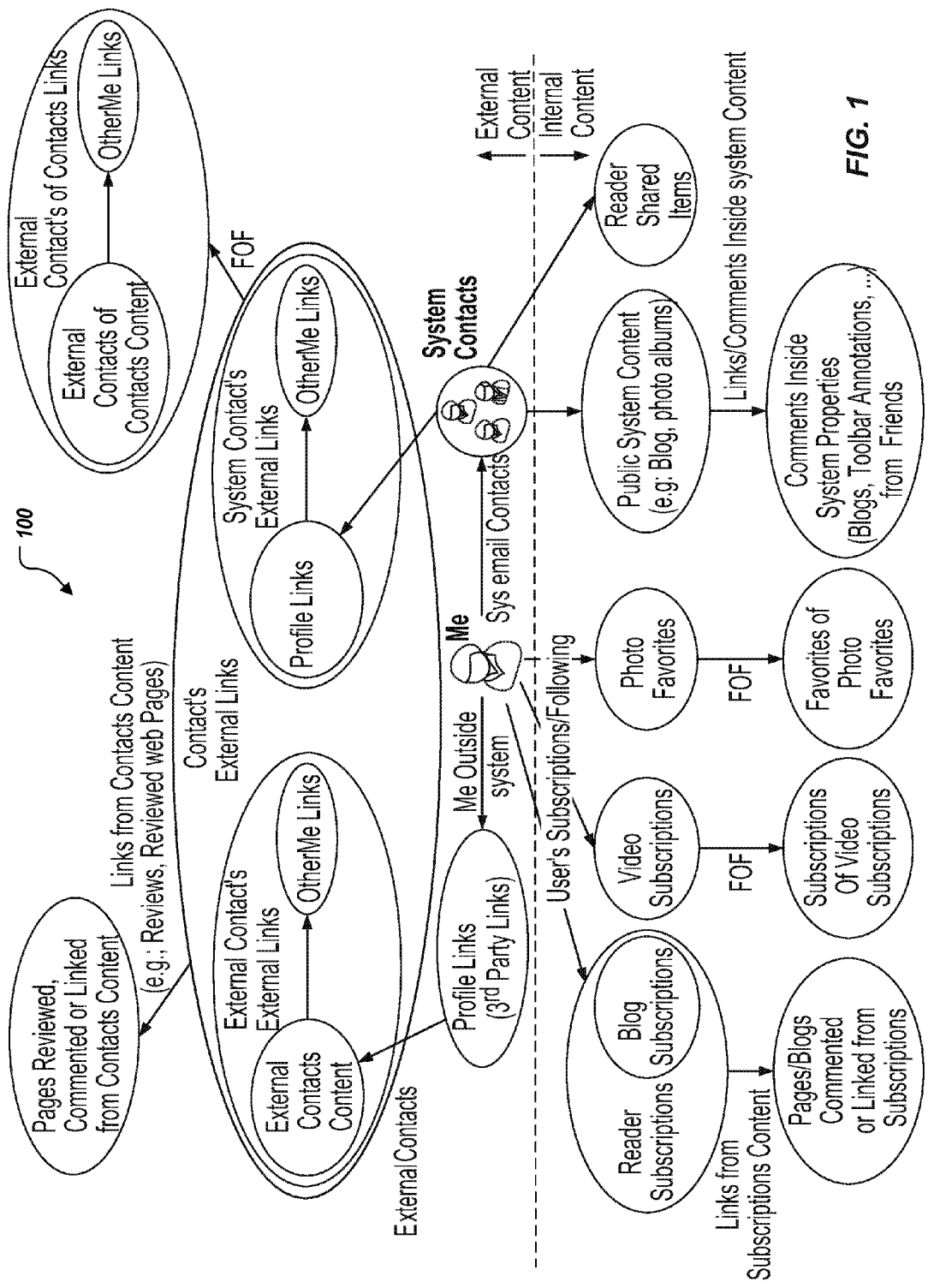
FIG. 1 is a diagram of example sources of social graph information.

Aspects of this specification are directed to retrieving and displaying user-generated content in search results. In some examples, user-generated content can include content that is generated using one or more social computer-implemented services. Example social computer-implemented services can include a social networking service, an electronic messaging service, a chat service, a micro-blogging service, a blogging service and a digital content sharing service. In some examples, the user-generated content can include content that is provided in electronic messages, chat sessions, posts to social networking services, content posted to sharing services (e.g., photo sharing services) and/or content posted to a blogging service. For purposes of illustration, and by way of non-limiting example, implementations of the present disclosure will be discussed in the context of digital content generated and distributed by users of social networking services. It is appreciated, however, that implementations of the present disclosure are applicable to other content types including, for example, electronic message content and chat content.

In some implementations, search results can be generated based on a search query provided by a searching user. The search results can include content that is publicly available. In some implementations, the search results can include user-generated content. In some examples, the user-generated content includes content that is generated by the searching user and/or other users. In some implementations, and as discussed in further detail herein, whether and how the user-generated content is displayed in the search results can be determined based on characteristics of the user-generated content In some examples, user-generated content can include content that is access controlled. Access controlled content can include content that is associated with privacy settings such that only select users are able to access the content. Example access controlled content can include content provided in electronic messages, chat sessions and/or posts to social networking services. For example, an electronic message can have privacy settings such that content of the electronic message is only accessible to the author of the electronic message and the recipients that the electronic message was sent to. As another example, a chat session can have privacy settings such that content of the chat session is only accessible to the participants in the chat session. As another example, a post to a social networking service can have privacy settings such that content of the post is only accessible to the author of the post and to users that the author has allowed access to.

In some implementations, author users associated with a particular searching user can be identified using a social graph of the searching user. As used in this specification, a social graph can refer to a single social graph or multiple interconnected social graphs. Distinct social graphs can be generated for different types of connections a user has. For example, a user can be connected with chat contacts in one social graph, electronic message contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

FIG. 1 is a diagram 100 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 100 shows a user and example connections that extend a user's social graph to people and content both within a system and across one or more external networks and shown at different degrees of separation. For example, a user can have a profile or contacts list that includes a set of identified friends, a set of links to external resources (e.g., web pages), and subscriptions to content of the system (e.g., a system that provides various content and applications including e-mail, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph can be specified by the user. In some implementations, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social graphing site) or type of interaction (e.g., endorsing or selecting items associated with friends). As interaction changes, the relationship of a particular contact in the social graph can also dynamically change. Thus, the social graph can be dynamic rather than static.

In some implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

In some implementations, social graphs can be stored using suitable data structures (e.g., list or matrix type data structures). Information describing any aspect of a stored social graph can be considered relationship data. For example, relationship data can include information describing how particular members of a user's social graph are connected to the user (e.g., through what social path is a particular entity connected to the user). Relationship data can also include information describing any relevant social signals incorporated in the user's social graph. In some implementations, relationship data can be stored in a relationship lookup table (e.g., a hash table). Suitable keys for locating values (e.g., relationship data) within the lookup table can include information describing the respective identities of both a user and any member of the user's social graph. For example, a suitable key for locating relationship data within the lookup table can be (User X, User Y), where User Y is a member of User X's social graph.

Figure 2:
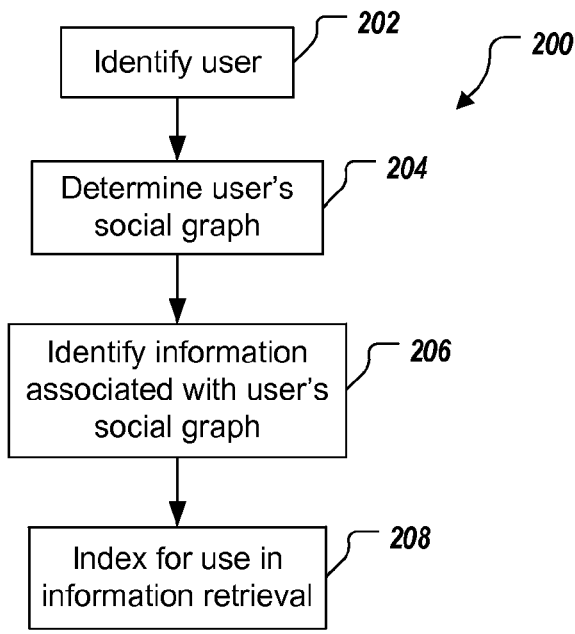
FIG. 2 is a flow diagram of an example process for using social graph information.

FIG. 2 is a flow diagram of an example process 200 for using social graph information. For convenience, the process 200 will be described with respect to a system, including one or more computing devices, that performs the process 200.

The system identifies a user (202). The user can be identified, for example, based on a user profile associated with the system. The user profile can be identified, for example, when the user logs into the system using a username, electronic message address, or other identifier.

The system determines the user's social graph (204). The user's social graph identifies people and resources associated with the user, for example, in which the user has indicated an interest. In some implementations, the social graph is limited to a specified number of degrees of separation from the user or particular relationships or types of interaction with the user. In some implementations, the user's social graph is generated by another system and provided upon request. In some examples, the user's social graph can be provided as an index that identifies each member of the user's social graph and indicates one or more services, through which the user and the member are connected (e.g., electronic message contacts, social networking contacts, etc.).

In some implementations, the user's social graph is determined using user profile data, as well as extracting information from users and resources identified in the user profile data. For example, the user's profile can include a list of the user's friends. The user's friends can include friends within the system (e.g., using a same e-mail or chat service that is affiliated with the system) or external to the system (e.g., social graphs or a list of contacts associated with third party applications or service providers). The user's profile can also include a list of subscriptions to which the user belongs (e.g., identifying content that the user follows, for example, particular blogs or feeds).

The user's profile can also include external links identified by the user. These links can identify particular content of interest. In some implementations, the user's profile also identifies other aliases used by the user (e.g., as associated with particular content providers or social graph sources). For example, a user may have a first identity for a chat application and a second identity for a restaurant review web site. These two identities can be linked together in order to unify the content associated with that user.

The social graph can be further expanded by extracting information from the identified people and content in the user's profile. For example, public profile information can exist for identified friends from which information can be extracted (e.g., their friends, links, and subscriptions). In some implementations, the user can adjust the members of the social graph directly. For example, the user can group their contacts (e.g., e-mail contacts) into particular groups accessed by the system in building the user's social graph.

Similarly, in some implementations, a user can prevent the system from adding members to the user's social graph, for example, by an opt-out option or by keeping contacts out of the particular groups used by the system to generate the social graph. In some implementations, privacy features provide a user with an opt-in or opt-out option to allow or prevent, respectively, being included (or remove the user if already included) as a member of another's social graph. Thus, users can have control over what personal information or connection information, if any, is included in social graphs.

The system can identify information associated with the user's social graph (206). The identified information associated with the user's social graph can include, for example, content or postings to web resources subscribed to by the user (e.g., particular blogs and/or microblogs). The identified information can also include content generated by members of the user's social graph. For example, members of a user's social graph can generate content including local reviews (e.g., for restaurants or services), video reviews and ratings, product reviews, book reviews, blog comments, news comments, maps, public web annotations, public documents, streaming updates, photos and photo albums.

The system can index the identified information associated with the user's social graph for use in information retrieval (208). In some implementations, identified information associated with the user's social graph can be indexed by generating and incorporating suitable data structures, such as social restricts, in an existing search index. In some examples, the system can generate social restricts by mapping the identified information to corresponding web resources referenced in a search index and determining the social connection between the web resources and the user. For example, the system can access a relationship lookup table which includes relationship data describing a user's social graph to determine such social connections. In some examples, social restricts can be provided in the form of an information tag associated with a referenced web resource included in the search index.

Figure 3:
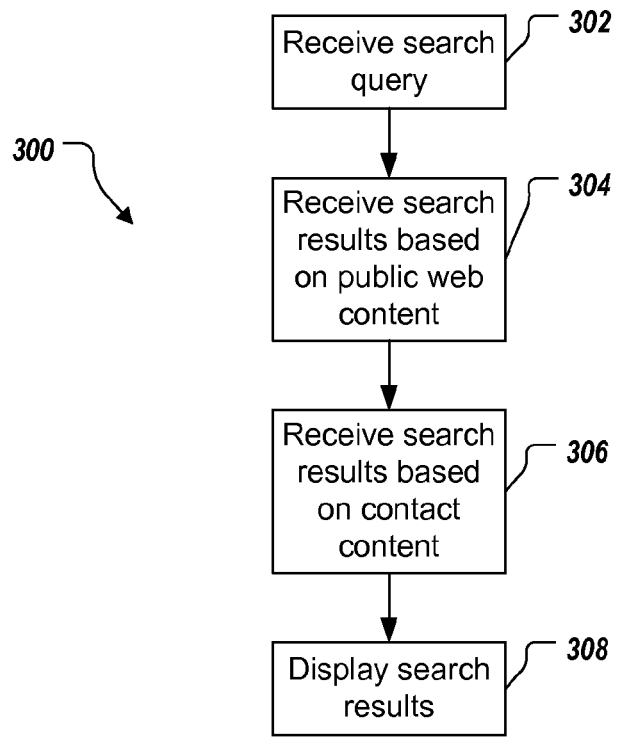
FIG. 3 is a flow diagram of an example process for presenting search results including social graph information.

FIG. 3 is a flow diagram of an example process 300 for retrieving and presenting search results including social graph information. For convenience, the process 300 will be described with respect to a search system including one or more computing devices that performs the process 300.

The search system receives a search query from a user (302). For example, the user can input a search query into a search interface of a particular system. The search query includes one or more terms and can be general or directed to particular types of resources (e.g., a web search or an image search).

The user can submit the search query from a client device. The client can be a computer coupled to the search system through a local area network (LAN) or wide area network (WAN), e.g., the Internet. In some implementations, the search system and the client device is a single machine. For example, a user can install a desktop search application on the client device. The user can submit the search query to a search engine within the search system.

When the user submits the search query, the search query is transmitted through a network to the search system. The search system can be implemented as, for example, computer programs running on one or more computers in one or more locations that are coupled to each other through a network.

The search system retrieves search results including search results associated with the user's social graph (304). For example, the system can retrieve search results including content generated by one or more members of the user's social graph. In some implementations, the search system can include a search engine for retrieving search results relevant to the received query. The search engine can include an indexing engine that indexes resources (e.g., web documents such as web pages, images, or news articles on the Internet) found in a corpus (e.g., a collection or repository of content), a search index that stores the index information, and a resource locator for identifying resources within the search index that are responsive to the query (for example, by implementing a query text matching routine).

In some examples, the search engine can also include a ranking engine (or other software) to rank web resources that match the query. The indexing and/or ranking of the web resources can be performed using conventional or other techniques. In some implementations, the identified information associated with the user's social graph can be included in a same index as other resources or a separate index. Consequently, a separate search can be performed for general search results responsive to the query, as well as particular search results that identify resources associated with the user's social graph (e.g., endorsed web resources).

The system presents one or more of search results including search results associated with the user's social graph (306). For example, the search system can present search results representing content generated by one or more members of the user's social graph and/or the searching user themself. In some implementations, the search engine can transmit retrieved search results through the network to the client device for presentation to the user, for example, as a search results web page to be displayed in a web browser running on the client device. In some implementations, the search system presents responsive search results associated with the user's social graph together in a cluster, separate from any general search results. In some embodiments, the system presents search results associated with the user's social graph intermixed with any retrieved general search results.

Figure 4:
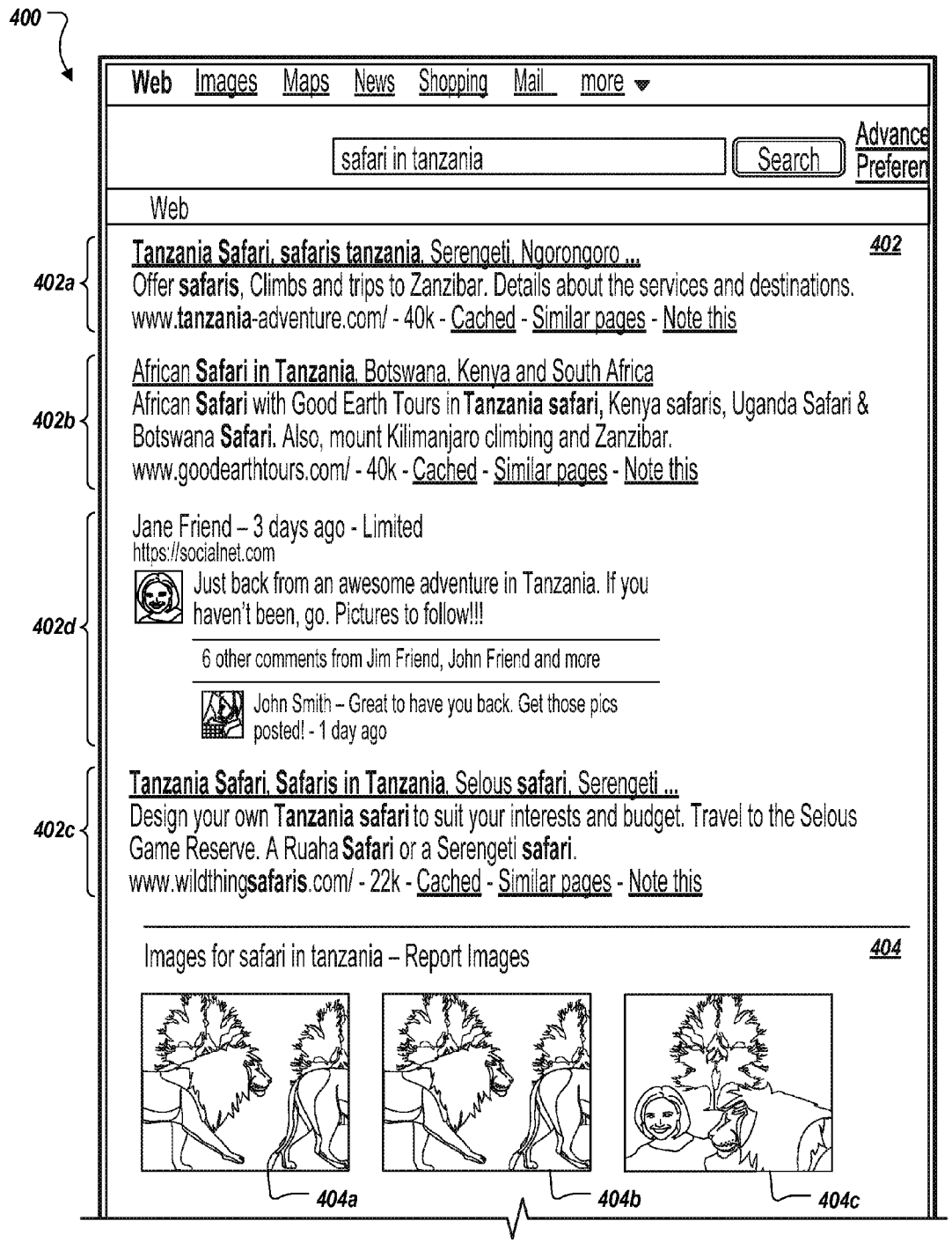
FIG. 4 is a representation of an example search results page including search results associated with the user's social graph.

FIG. 4 is a representation of an example search results page 400 that includes results associated with the user's social graph. The search results page 400 displays example search results responsive to the example query "safari in Tanzania." In the depicted example, the displayed search results include web search results 402 and image search results 404. The web search results 402 include search results 402a, 402b, 402c, 402d. The search results 402a, 402b, 402c are associated with resources (e.g., web pages) that are publicly accessible on the Internet.

The search result 402d includes user-generated content that is deemed to be relevant to the search query. In the depicted example, the search result 402d includes access controlled content provided as a post that is distributed using a social networking service. For example, the author user "Jane Friend" generated the post and distributed the post to select users. In the depicted example, the distribution for the post is provided as "Limited," indicating that only users selected by the author user are able to access the post. Consequently, "Jane Friend" is a member of the searching user's social graph and the searching user has been identified in the distribution. In some examples, the distribution can include a public distribution, such that any user, whether a contact of the author user, is able to access the post.

The image results 404 include responsive search results associated with images that are publicly available and images that are associated with a social graph of the user. For example, the image results can include images 404a, 404b, 404c. In the depicted example, the images 404a, 404b can include publicly available images and the image 404c includes an image that is posted by a member of the searching user's social graph. For example, the image 404c can be an image posted by the user "Jane Friend," who authored the post provided as the search result 402d.

Figure 5:
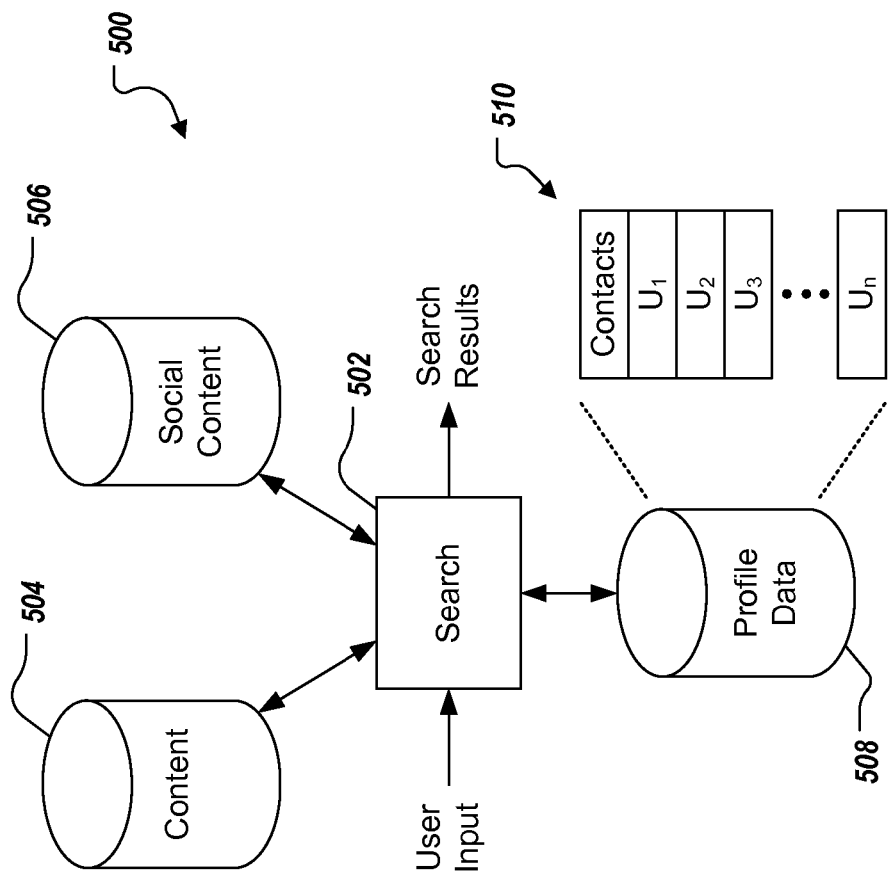
FIG. 5 depicts example components that can be used to provide user-generated content in search results based on a user's social graph.

FIG. 5 depicts example components that can be used to provide user-generated content in search results based on a user's social graph. The example components include a search component 502, a content data source 504, a user-generated content data source 506 and a profile data source 508. In some examples, the search component 502 can be provided as one or more computer programs executed using on or more computing devices (e.g., servers). In some examples, each of the data sources 504, 506, 508 can be provided as one or more computer-readable storage devices (e.g., databases). The search component 502 can communicate with each of the data sources 504, 506, 508 via a network (e.g., a local area network (LAN) or wide area network (WAN), the Internet). The search component 502 receives user input, processes the user input based on data of provided from the data sources 504, 506, 508 and generates search results. The user input can be provided via a computing device (e.g., a client computing device) and the search results can be provided to the computing device for display to the user.

In some examples, the user input can include user log-in information (e.g., username and password) that can be used to log the user into a search service provided by the search component 502. The search component 502 can identify a user profile based on the user input and can retrieve profile data corresponding to the user from the profile data source 508. In some examples, the user profile data can include a contact index 510. The contact index 510 can be used to identify members of the user's social graph. For example, the user's social graph can include user's $U_1, \ldots U_n$.

The user input can include a search query that is received by the search component 502. In response to receiving the search query, the search component 502 can process data provided by the content data source 504 and the user-generated data source 506 to generate search results. In some examples, in response to receiving the search query, the search component 502 can retrieve the contact index 510 corresponding to the user that provided the search query (e.g., based on the user's log-in information). The search component 502 can access the user-generated data source 506 to retrieve user-generated content that may be relevant to the search results and that the search user is allowed access to. In some examples, the user-generated content can include electronic messages, chats, posts to social networking services, blog posts, and/or micro-blog posts. The user-generated content can be content that is generated by members of the searching user's social graph or content that is generated by the searching user themselves. The search component 502 can receive the user-generated content and data associated with the user-generated content. The search component 502 can determine whether particular user-generated content is to be provided as search results. In some examples, and as discussed in further detail herein, the search component can determine whether and how to display particular user-generated content as search results based on the parameters. In some examples, whether the particular user-generated content is to be displayed can be determined based on the search query.

By way of non-limiting example, the user-generated content can include a post that is posted to a social networking service. Example data associated with the post can include a timestamp, a topicality score (TS) and a post score (PS) (also referred to as an overall score). In some examples, the timestamp indicates a time that the post was distributed to the social networking service. In some examples, the timestamp indicates a time when an event occurred to the post. Example events can include a comment to the post, a re-sharing of the post and an endorsement of the post.

In some examples, the topicality score can indicate a degree to which the content of the post pertains to the search query. In some examples, the topicality score can indicate a degree to which the content of the post pertains to a matter of interest. In some examples, content can pertain to a matter that is recently in the news. For example, a matter of interest can include a natural disaster and can be a frequent topic of content distributed on the Internet within a given time period. If the content of the post relates to the natural disaster, the post may be deemed to be topical and can have an associated topicality score reflecting this.

In some examples, the post score (or overall score) reflects a quality of the post and a relevance of the post to the particular searching user. For example, the post can have a first post score associated therewith that reflects a quality of the post and a relevance of the post to a first searching user. The post can have a second post score associated therewith that reflects a quality of the post and a relevance of the post to a second searching user. The first post score and the second post score can be different from one another.

In some examples, the topicality score and the post scores are generated by a scoring service and can be provided to the user-generated content data store (e.g., the data store 506 of FIG. 5).

In some implementations, whether the user-generated content is to be displayed in the search results can be determined based on the search query. In some examples, it can be determined whether the search query provided by the searching user is a trending search query. In some example, a trending search query can include a search query that is frequently provided to a searching service for a given period of time. By way of non-limiting example, a first search query can be provided to the searching service X times by various users within the last Y days. A second search query can be provided to the searching service Z times by various searching users within the last Y days. A first frequency can be determined based on X and a second frequency can be determined based on Z. The first frequency and the second frequency can be compared to a threshold frequency. If a frequency is greater than or equal to the threshold frequency, the associated search query can be deemed to be a trending search query. For example, the first frequency is greater than or equal to the threshold frequency and the second frequency is less than the threshold frequency. Consequently, the first search query is determined to be a trending search query and the second search query is not determined to be a trending search query.

In some implementations, user-generated content can be identified as a potential search result based on a relevance of the user-generated content to the search query. In some examples, if the identified user-generated content is determined to be sufficiently recent and is determined to be sufficiently topical, the user-generated content is displayed as a search result. In some examples, if the user-generated content is not deemed to be sufficiently recent or the user-generated content is not deemed to be sufficiently topical, it can be determined whether the search query used to identify the user-generated content as a potential search result is a trending query. If the search query is a trending query, if the user-generated content is deemed to be somewhat recent and if the user-generated content is determined to be somewhat topical, the user-generated content is displayed as a search result. In some examples, if the search query is not a trending query, if the user-generated content is not deemed to be somewhat recent or if the user-generated content is not determined to be somewhat topical, and, if the post score of the user-generated content is greater than or equal to a threshold post score, the user-generated content is displayed as a search result. In some examples, if the search query is not a trending query, if the user-generated content is not deemed to be somewhat recent or if the user-generated content is not determined to be somewhat topical, and if the post score of the user-generated content is less than a threshold post score, the user-generated content is not displayed as a search result.

In some examples, whether user-generated content is sufficiently recent can be determined based on a current time ($t_{CURR}$), the timestamp of the user-generated content ($t_{POST}$) and a first threshold ($t_{THR1}$). In some examples, the current time is provided as the time at which the search query is submitted by the searching user. In some examples, a time difference ($t_{DIFF}$) can be determined as a difference between the current time and the timestamp of the user-generated content. If the time difference is less than the first threshold, the user-generated content can be determined to be sufficiently recent. In some examples, whether user-generated content is somewhat recent can be determined based on the current time, the timestamp of the user-generated content and a second threshold ($t_{THR2}$). In some examples, if the time difference is less than the second threshold, the user-generated content can be determined to be somewhat recent. In some examples, the first threshold is less than the second threshold.

In some examples, whether user-generated content is sufficiently topical can be determined based on a topicality score of the user-generated content ($TS_{POST}$) and a first topicality score threshold ($TS_{THR1}$). If the topicality score of the user-generated content is less than the first topicality score threshold, the user-generated content can be determined to be sufficiently topical. In some examples, whether user-generated content is somewhat topical can be determined based on the topicality score of the user-generated content and a second topicality score threshold ($TS_{THR2}$). If the topicality score of the user-generated content is less than the second topicality score threshold, the user-generated content can be determined to be somewhat topical. In some examples, the first topicality score threshold is greater than the second topicality score threshold.

In some implementations, if it is determined that the user-generated content is to be displayed in the search results, how and where the user-generated content is displayed can be determined. In some examples, the user-generated content can be displayed at the bottom of a search results page. In some examples, the user-generated content can be displayed within other search results (e.g., in the middle of a search results page). By way of non-limiting example, if the time difference, discussed above, is less than a third threshold ($t_{THR3}$) and the topicality score is greater than or equal to a third threshold topicality score ($TS_{THR3}$), the user-generated content is provided within other search results (e.g., in the middle or towards the top of a search results page). In some examples, the first threshold is equal to the third threshold. In some examples, the first topicality score threshold is equal to the third topicality score threshold. In the example of FIG. 4, it can be determined that the user-generated content of the search result 402d is associated with a time difference that is less than the third threshold and a topicality score that is greater than or equal to the third threshold topicality score. Consequently, the user-generated content of the search result 402d is displayed in-line with the other search results 402a, 402b, 402c.

In some implementations, user-generated content that includes an image can be analyzed to determine where to display the user-generated content within the search results. In some examples, if the user-generated content includes a single image and text, the user-generated content can be displayed as a web search result (e.g., in the web search results 402 of FIG. 4), as discussed above. In some examples, if the user-generated content includes one or more images without text, the image can be displayed within the image search results. In the example of FIG. 4, the image 404c can be an image that was provided in a post that was distributed using a social networking service and that did not include text. Consequently, the image 404c is displayed in the image search results 404 instead of the underlying post being displayed as a search result in and of itself. In some examples, if the user-generated content includes a plurality of images with text, the user-generated content can be displayed as a web search result (e.g., in the web search results 402 of FIG. 4) and the images can be displayed as image search results (e.g., in the image search results 404 of FIG. 4).

In some implementations, a user may provide permission (e.g., to a search engine) to access an account containing the user's confidential or non-public user-generated content. For example, the user may give a search engine permission to access electronic messaging account, a calendar, a cloud drive, and so forth. In some implementations, the search engine may index messages or other content in the account, may retrieve messages or other content that match a search query, and may present these messages, or portions thereof, in search results.

In some implementations, if an input search query does not specifically request electronic messaging content (e.g., if the query were to read "biking in Tahoe" only), the search engine may still make confidential or non-public search content available to the user (where appropriate permission has been obtained). For example, a search query (e.g., "biking in Tahoe"), does not include any reference to electronic messages or other user-generated content. In some implementations, the search engine may identify relevant user-generated content in the manner described above, and provide the user with an option to view the search results. In some implementations, the option identifies the type of user-generated content that it contains. For example, the option can specify electronic messages. In some implementations, additional options may be available to provide relevant content, e.g., from a user's online calendar, cloud drive, and so forth.

In some implementations, selecting a corresponding option displays the corresponding content. For example, selecting the option to view electronic messages may cause the display of portions of electronic messages. For example, selecting a displayed electronic message may direct the user to their messaging account to view the entire contents of that message. The same may be true for other types of content, such as calendar content and cloud drive documents.

Figure 6:
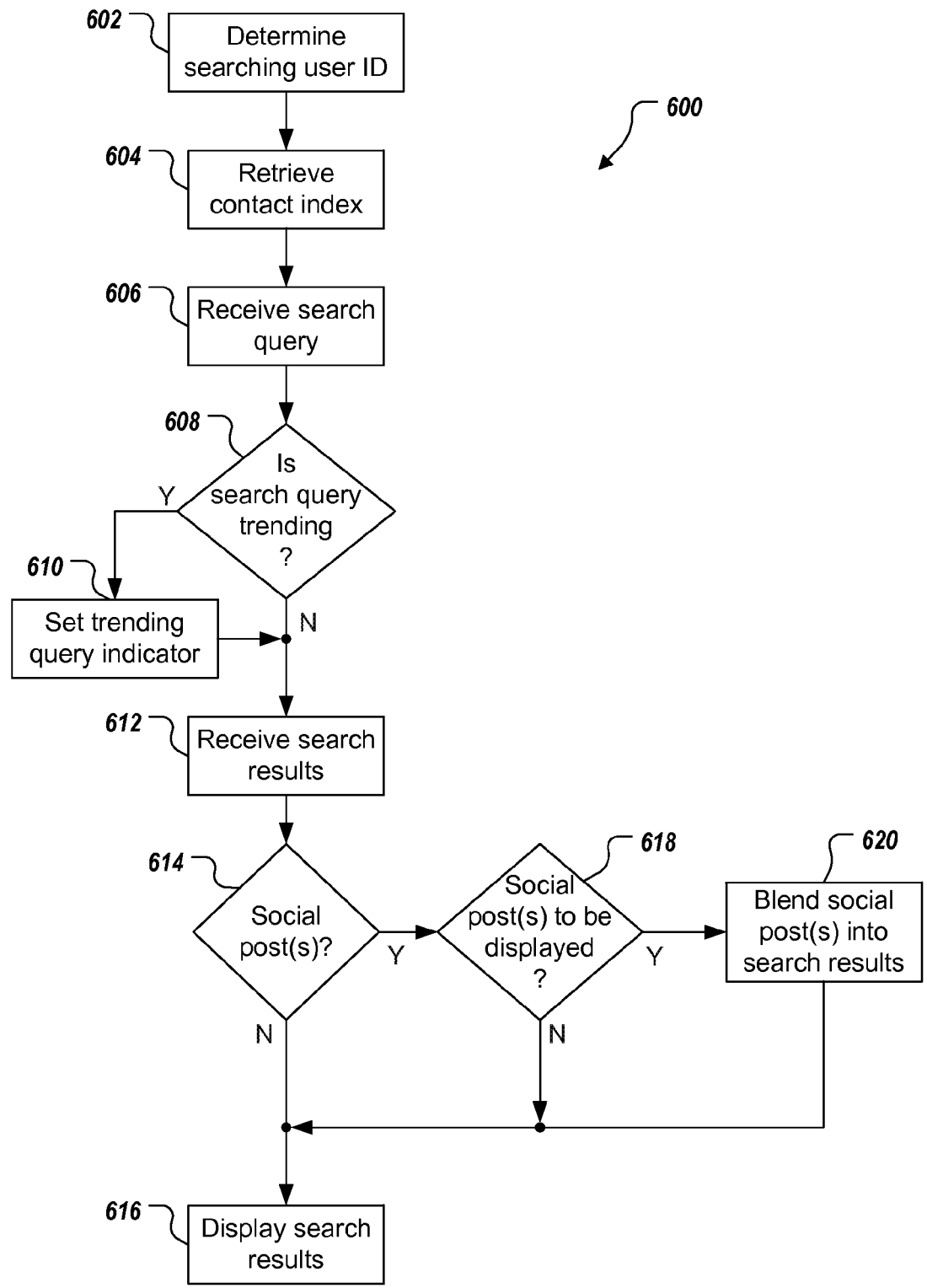
FIG. 6 is a flow diagram of an example process that can be executed in implementations of the present disclosure.

FIG. 6 is a flow diagram of an example process 600 that can be executed in implementations of the present disclosure. For convenience, the example process 600 will be described with respect to a system including one or more computing devices that performs the example process 600.

The ID of searching user is determined (602). In some examples, the ID of the searching user (i.e., the user that is performing a search) can be determined based on user log-in information (e.g., username and password). A contact index corresponding to the searching user ID is retrieved (604). A search query is received (606). It is determined whether the search query is a trending search query (608). If the search query is a trending search query, a trending search query indicator is set (610).

Search results are generated and are received (612). It is determined whether the search results include user-generated content. In the example context, it is determined whether the search results include digital content (e.g., posts) distributed by contacts of the user within a computer-implemented social networking service (614). If the search results do not include user-generated content, the search results are displayed (616).

If the search results include user-generated content, it is determined whether the user-generated content is to be displayed in the search results. In the example context, it is determined whether digital content (e.g., posts) distributed by contacts of the user within the computer-implemented social networking service are to be displayed (618). If it is determined that the user-generated content is not to be displayed, the user-generated content is removed from the search results and the search results are displayed (616). If it is determined that the user-generated content is to be displayed, the user-generated content is blended with the other search results and the search results are displayed (616).

Figure 7:
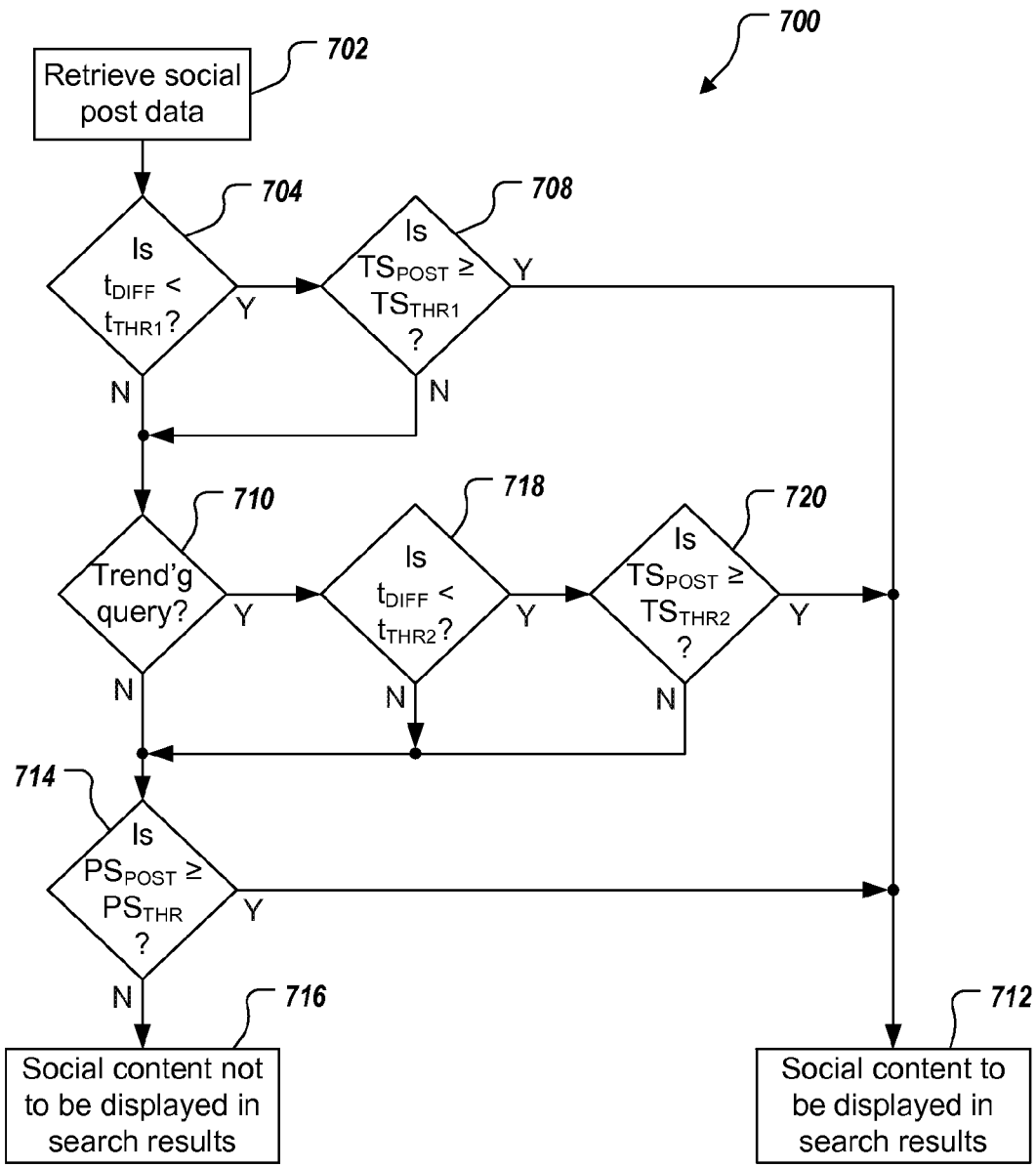
FIG. 7 is a flow diagram of an example process that can be executed in implementations of the present disclosure.

FIG. 7 is a flow diagram of an example process 700 that can be executed in implementations of the present disclosure. For convenience, the example process 700 will be described with respect to a system including one or more computing devices that performs the example process 700. In some examples, the process 700 can be executed to determine whether particular user-generated content (e.g., posts posted to a social networking service).

Data associated with the user-generated content is retrieved. In the example context, data associated with digital content (e.g., posts) distributed by contacts of the user within the computer-implemented social networking service is retrieved (702). The data can be used to determine whether to display the user-generated content within the search results. In some implementations, the data can be used to determine where and how to display the user-generated content within the search results. In some examples, the data can include timestamp data (e.g., when the user-generated content was generated, commented on, re-shared) and scoring data. Example scoring data can include a social content score and a topicality score.

It is determined whether the time difference ($t_{DIFF}$) is less than the first threshold ($t_{THR1}$) (704). If $t_{DIFF}$ is less than $t_{THR1}$, it is determined whether the topicality score ($TS_{POST}$) is greater than or equal to the first threshold topicality score ($TS_{THR1}$) (708). If $t_{DIFF}$ is not less than $t_{THR1}$, it is determined whether the search query is a trending query (710). If $TS_{POST}$ exceeds or is equal to $TS_{THR1}$, the user-generated content is displayed in search results (712). If $TS_{POST}$ does not exceed or is not equal to $TS_{THR1}$, it is determined whether the search query is a trending query (710). If the search query is not a trending query, it is determined whether the post score ($PS_{POST}$) associated with the user-generated content exceeds or is equal to a threshold post score ($PS_{THR}$) (714). If the search query is a trending query, it is determined whether $t_{DIFF}$ is less than the second threshold ($t_{THR2}$) (718). If $t_{DIFF}$ is not less than $t_{THR2}$, it is determined whether $PS_{POST}$ exceeds or is equal to $PS_{THR}$ (714). If $t_{DIFF}$ is less than $t_{THR2}$, it is determined whether $TS_{POST}$ exceeds or is equal to the second threshold topicality score ($TS_{THR2}$) (720). If $TS_{POST}$ exceeds or is equal to $TS_{THR2}$, the user-generated content is displayed in search results (712). If $TS_{POST}$ does not exceed or is not equal to $TS_{THR2}$, it is determined whether $PS_{POST}$ exceeds or is equal to $PS_{THR}$ (714). If $PS_{POST}$ exceeds or is equal to $PS_{THR}$, the user-generated content is displayed in search results (712). If $PS_{POST}$ does not exceed or is not equal to $PS_{THR}$, the user-generated content is not displayed in search results (712).

Implementations of the present disclosure and all of the functional operations described in this specification can be implemented in digital electronic circuitry, or in computer software, firmware, or hardware, including the structures disclosed in this specification and their structural equivalents, or in combinations of one or more of them. Embodiments of the present disclosure can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the present disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the present disclosure or of what may be claimed, but rather as descriptions of features specific to particular embodiments of the present disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the present disclosure have been described. Other embodiments are within the scope of the following claims. For example, the actions recited in the claims can be performed in a different order and still achieve desirable results.

What is claimed is:

1. A computer-implemented method comprising:
   receiving, by one or more processors, a search query;
   receiving, by one or more processors, an identifier associated with a user that submitted the search query;
   identifying, by the one or more processors, potential search results responsive to the search query, the potential search results corresponding to digital content stored in one or more computer-readable storage media; and
   determining, by the one or more processors and at least partly based on the identifier, that the potential search results comprise user-generated content that is generated using one or more social computer-implemented services and is associated with a social graph of the user, the social graph of the user comprising a collection of connections identified as having a relationship to the user, and that the user is allowed to access the user-generated content based on respective access controls applied to the user-generated content by authors thereof, the user-generated content comprising one or more content items, and in response:
      receiving, by the one or more processors, data associated with the user-generated content, the data comprising one or more scores associated with respective content items, at least one score being specific to the user and a respective content item,
      for at least one content item, determining a time difference based on a timestamp associated with the at least one content item, the time difference indicating how recently the at least one content item was active, and determining, based on the time difference and the one or more scores, that the at least one content item is to be provided as a search result,
      receiving, by the one or more processors, search results, the search results comprising web-based search results and the at least one content item, and
      transmitting, by the one or more processors, the search results to a client computing device for display to the searching user, a display location of the at least one content item with respect to the web-based search results is at least partly determined by one or more scores associated with the at least one content item.

2. The method of claim 1, further comprising determining that a topicality score associated with the at least one content item is greater than or equal to a threshold topicality score, the topicality score being included in the one or more scores, wherein determining that the at least one content item is to be provided as a search result occurs in response to determining that the topicality score associated with the at least one content item is greater than or equal to the threshold topicality score.

3. The method of claim 2, wherein the topicality score indicates a degree to which the at least one content item pertains to the search query.

4. The method of claim 2, wherein the topicality score indicates a degree to which the at least one content item pertains to a matter of interest.

5. The method of claim 2, further comprising determining that the at least one content item is recently generated content, wherein determining that the topicality score associated with the at least one content item is greater than or equal to the threshold topicality score occurs in response to determining that the at least one content item is recently generated content.

6. The method of claim 2, further comprising:
   determining that the search query is a trending search query; and
   determining that the at least one content item is recently generated content, wherein determining that the topicality score associated with the at least one content item is greater than or equal to the threshold topicality score occurs in response to determining that the search query is a trending search query and determining that the at least one content item is recently generated content.

7. The method of claim 1, further comprising determining that an overall score associated with the at least one content item is greater than or equal to a threshold overall score, the overall score being included in the one or more scores, wherein determining that the at least one content item is to be provided as a search result occurs in response to determining that the overall score associated with the at least one content item is greater than or equal to the threshold overall score.

8. The method of claim 7, further comprising determining that the search query is not a trending search query, wherein determining that the overall score associated with the at least one content item is greater than or equal to the threshold overall score occurs in response to determining that the search query is not a trending search query.

9. The method of claim 7, wherein the overall score reflects a quality of the at least one content item and a relevance of the at least one content item to the searching user.

10. The method of claim 1, further comprising:
determining that the at least one content item comprises a digital image; and
determining that the digital image is to be displayed within an image search results portion of the search results.

11. The method of claim 10, further comprising determining that the at least one content item is without text associated with the digital image, wherein determining that the digital image is to be displayed within the image search results portion of the search results occurs in response to determining that the at least one content item is without text associated with the digital image.

12. A system comprising:
one or more computers configured to perform operations comprising:
receiving a search query;
receiving an identifier associated with a user that submitted the search query;
identifying potential search results responsive to the search query, the potential search results corresponding to digital content stored in one or more computer-readable storage media;
determining, by the one or more processors and at least partly based on the identifier, that the potential search results comprise user-generated content that is generated using one or more social computer-implemented services and is associated with a social graph of the user, the social graph of the user comprising a collection of connections identified as having a relationship to the user, and that the user is allowed to access the user-generated content based on respective access controls applied to the user-generated content by authors thereof, the user-generated content comprising one or more content items, and in response:
receiving, by the one or more processors, data associated with the user-generated content, the data comprising one or more scores associated with respective content items, at least one score being specific to the user and a respective content item,
for at least one content item, determining a time difference based on a timestamp associated with the at least one content item, the time difference indicating how recently the at least one content item was active, and determining, based on the time difference and the one or more scores, that the at least one content item is to be provided as a search result,
receiving, by the one or more processors, search results, the search results comprising web-based search results and the at least one content item, and
transmitting, by the one or more processors, the search results to a client computing device for display to the searching user, a display location of the at least one content item with respect to the web-based search results is at least partly determined by one or more scores associated with the at least one content item.

13. The system of claim 12, wherein operations further comprise determining that a topicality score associated with the at least one content item is greater than or equal to a threshold topicality score, the topicality score being included in the one or more scores, wherein determining that the at least one content item is to be provided as a search result occurs in response to determining that the topicality score associated with the at least one content item is greater than or equal to the threshold topicality score.

14. The system of claim 13, wherein the topicality score indicates a degree to which the at least one content item pertains to the search query.

15. The system of claim 13, wherein the topicality score indicates a degree to which the at least one content item pertains to a matter of interest.

16. The system of claim 13, wherein operations further comprise determining that the at least one content item is recently generated content, wherein determining that the topicality score associated with the at least one content item is greater than or equal to the threshold topicality score occurs in response to determining that the at least one content item is recently generated content.

17. The system of claim 13, wherein operations further comprise:
determining that the search query is a trending search query; and
determining that the at least one content item is recently generated content, wherein determining that the topicality score associated with the at least one content item is greater than or equal to the threshold topicality score occurs in response to determining that the search query is a trending search query and determining that the at least one content item is recently generated content.

18. The system of claim 12, wherein operations further comprise determining that an overall score associated with the at least one content item is greater than or equal to a threshold overall score, the overall score being included in the one or more scores, wherein determining that the at least one content item is to be provided as a search result occurs in response to determining that the overall score associated with the at least one content item is greater than or equal to the threshold overall score.

19. The system of claim 18, wherein operations further comprise determining that the search query is not a trending search query, wherein determining that the overall score associated with the at least one content item is greater than or equal to the threshold overall score occurs in response to determining that the search query is not a trending search query.

20. A non-transitory computer-readable medium storing instructions that, when executed by one or more processors, cause the one or more processors to perform operations comprising:
receiving a search query;
receiving an identifier associated with a user that submitted the search query;
identifying potential search results responsive to the search query, the potential search results corresponding to digital content stored in one or more computer-readable storage media;
determining, by the one or more processors and at least partly based on the identifier, that the potential search results comprise user-generated content that is generated using one or more social computer-implemented services and is associated with a social graph of the user, the social graph of the user comprising a collection of connections identified as having a relationship to the user, and that the user is allowed to access the user-generated content based on respective access controls applied to the user-generated content by authors thereof, the user-generated content comprising one or more content items, and in response:
receiving, by the one or more processors, data associated with the user-generated content, the data comprising one or more scores associated with respective content items, at least one score being specific to the user and a respective content item, for at least one content item, determining a time difference based on a timestamp associated with the at least one content item, the time difference indicating how recently the at least one content item was active, and determining, based on the time difference and the one or more scores, that the at least one content item is to be provided as a search result, receiving, by the one or more processors, search results, the search results comprising web-based search results and the at least one content item, and transmitting, by the one or more processors, the search results to a client computing device for display to the searching user, a display location of the at least one content item with respect to the web-based search results is at least partly determined by one or more scores associated with the at least one content item.

21. The computer-readable medium of claim 20, wherein the operations further comprise determining that a topicality score associated with the at least one content item is greater than or equal to a threshold topicality score, the topicality score being included in the one or more scores, wherein determining that the at least one content item is to be provided as a search result occurs in response to determining that the topicality score associated with the at least one content item is greater than or equal to the threshold topicality score.

22. The computer-readable medium of claim 21, wherein the topicality score indicates a degree to which the at least one content item pertains to the search query.

23. The computer-readable medium of claim 21, wherein the topicality score indicates a degree to which the at least one content item pertains to a matter of interest.

24. The computer-readable medium of claim 21, wherein operations further comprise determining that the at least one content item is recently generated content, wherein determining that the topicality score associated with the at least one content item is greater than or equal to the threshold topicality score occurs in response to determining that the at least one content item is recently generated content.

25. The computer-readable medium of claim 21, wherein operations further comprise:

determining that the search query is a trending search query; and determining that the at least one content item is recently generated content, wherein determining that the topicality score associated with the at least one content item is greater than or equal to the threshold topicality score occurs in response to determining that the search query is a trending search query and determining that the at least one content item is recently generated content.

26. The computer-readable medium of claim 20, wherein operations further comprise determining that an overall score associated with the at least one content item is greater than or equal to a threshold overall score, the overall score being included in the one or more scores, wherein determining that the at least one content item is to be provided as a search result occurs in response to determining that the overall score associated with the at least one content item is greater than or equal to the threshold overall score.

27. The computer-readable medium of claim 26, wherein operations further comprise determining that the search query is not a trending search query, wherein determining that the overall score associated with the at least one content item is greater than or equal to the threshold overall score occurs in response to determining that the search query is not a trending search query.

* * * * *